United States Patent [19]

Lundell

[11] Patent Number: 5,413,487
[45] Date of Patent: May 9, 1995

[54] DENSIFIER AND COOLING ELEVATOR

[76] Inventor: Vernon J. Lundell, Box 171, Cherokee, Iowa 51012

[21] Appl. No.: 955,404

[22] Filed: Oct. 2, 1992

[51] Int. Cl.6 ............................................. B29C 47/00
[52] U.S. Cl. ..................................... 425/311; 100/74; 100/905; 425/331; 425/DIG. 230
[58] Field of Search .................... 100/74, 905; 425/314, 425/331, 311, 335, 365, 374, 464, DIG. 230

[56] References Cited

U.S. PATENT DOCUMENTS

| Re. 25,972 | 3/1966 | Knoth | 100/905 |
|---|---|---|---|
| 3,170,414 | 2/1965 | Harrington et al. | 100/905 |
| 3,177,821 | 4/1965 | Harrington | 100/905 |
| 3,225,711 | 12/1965 | Forth et al. | 425/331 |
| 3,251,316 | 5/1966 | Forth | 425/331 |
| 3,304,889 | 2/1967 | Tarbox et al. | 425/331 |
| 3,354,844 | 11/1967 | Roll et al. | 425/331 |
| 3,363,587 | 1/1968 | Harrington | 425/331 |
| 3,807,926 | 4/1974 | Morse | 425/331 |
| 3,841,817 | 10/1974 | Moldenhauer et al. | 425/331 |
| 3,949,036 | 4/1976 | Nelson | 425/331 |

FOREIGN PATENT DOCUMENTS

| 668209 | 3/1952 | United Kingdom | 100/905 |
|---|---|---|---|
| 1019853 | 2/1966 | United Kingdom | 425/331 |
| 1061748 | 12/1983 | U.S.S.R. | 425/331 |

Primary Examiner—Charles S. Bushey
Attorney, Agent, or Firm—Jacobson, Price, Holman & Stern

[57] ABSTRACT

A densifier and cooling elevator for compressing previously separated burnable waste material into cubes of desired length and shape with the cubes forming a fuel for various purposes in which a burnable product can be effectively used. The densifier includes a rotatable drum and a plurality of circumferentially positioned die tubes which are welded together and held in rigid radial position. The inner ends of the die tubes are supplied with waste material treated previously in various stages of a waste recycling apparatus. Oppositely disposed rollers engage, compress and compact the waste material into the die tubes and extrude the compacted waste material from the die tubes as a dense cube. The cooling elevator supplies the previously treated burnable waste material to the drum and is provided with spray nozzles that may be optionally employed to cool or provide moisture to the waste material to more effectively enable the waste material to be compressed and compacted into cubes.

18 Claims, 4 Drawing Sheets

DENSIFIER AND COOLING ELEVATOR

BACKGROUND OF THE INVENTION

1. Field of the Invention

The present invention generally relates to waste material recycling apparatus and more particularly to a densifier and cooling elevator for compressing previously separated burnable waste material into cubes of desired length and shape with the cubes forming a fuel for various purposes in which a burnable product can be effectively used. The densifier includes a rotatable drum and a plurality of circumferentially positioned die tubes which are welded together and held in rigid radial position. The inner ends of the die tubes are supplied with waste material treated previously in various stages of a waste recycling apparatus. Oppositely disposed rollers engage, compress and compact the waste material into the inner ends of the die tubes and extrude the compacted waste material from the die tubes as a dense cube. The cooling elevator supplies the previously treated burnable waste material to the drum and is provided with spray nozzles that may be optionally employed to cool or provide moisture to the waste material to more effectively enable the waste material to be compressed and compacted into cubes.

2. Information Disclosure Statement

Various efforts have been made to separate waste material and compress it into pellets, blocks and the like which can be used for general purpose fuels such as use in firing boilers and the like. However, the prior art in this field does not include the specific structural arrangements incorporated into this invention.

SUMMARY OF THE INVENTION

An object of the present invention is to provide a densifier for compressing and compacting comminuted waste material to form compressed cubes of burnable material that can be used as a fuel wherever desired with the densifier including a roller arrangement associated with a plurality of circumferentially arranged radially disposed welded die tubes onto which the material is deposited with the rollers compacting and compressing the waste material into the die tubes and extruding the waste material from the outer ends of the die tubes as a dense cube.

Another object of the invention is to provide a densifier with a cooling elevator in which the supply elevator for waste material to the densifier is provided with spray nozzles and is open to the atmosphere for cooling the waste material as it enters the densifier.

A further object of the invention is to provide a densifier in accordance with the preceding objects in which the densifier includes a rotatable drum with a spiral flight thereon to convey the material from an inlet chute to the die tubes for discharge onto the die tubes in the path of movement of a pair of diametrically opposed rollers which compact and compress the waste material into the die tubes.

A still further object of the invention is to provide a densifier in accordance with the preceding objects in which the die tubes are provided with adjustable wear rails along each side of the inner end thereof to maintain the material on the die tubes and reduce wear on the die tubes with the tubes being welded together and to circular reinforcing side plates either as a continuous circle or as segments to facilitate assembly and replacement.

Still another important object of the invention is to provide a densifier in accordance with the preceding objects in which the diametrically opposed rollers have a zig zag rib thereon to retain waste material between the rollers and die tubes thereby in effect causing wear the waste material rather than on the die tubes or rollers.

Yet another feature of the invention is to provide a densifier including an enlarged wheel-like structure supporting the die tubes with closure plates for the interior of the wheel to retain the material and to enable access to the interior of the densifier for repair, inspection, cleaning and the like.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
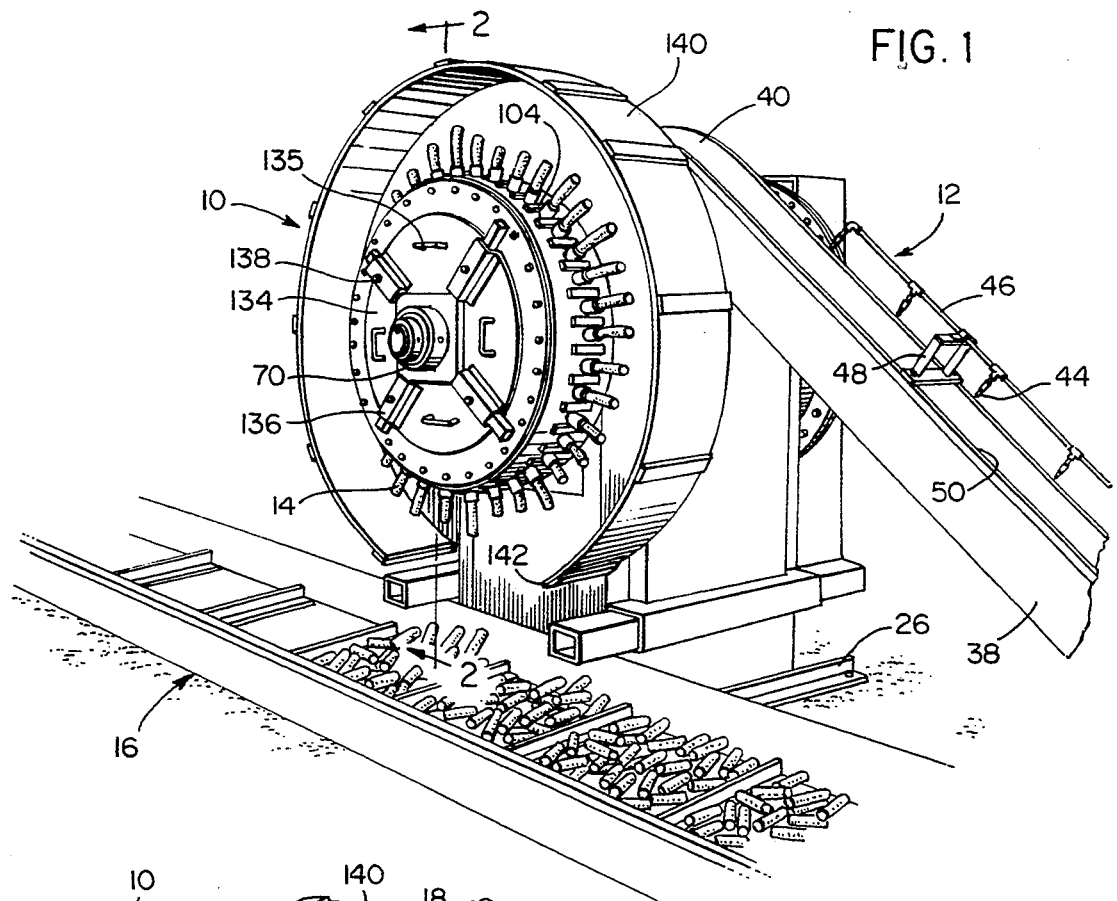
FIG. 1 is a perspective view of the densifier and cooling elevator of the present invention.

Referring to the drawings, the densifier of the present invention is generally designated by reference numeral 10 and the cooling elevator associated therewith is generally designated by the numeral 12. As illustrated in FIG. 1, the densifier forms a plurality of extruded cubes 14 of burnable material and discharges these cubes into a conveyor structure generally designated by the numeral 16 to transport the cubes 14 to a bagging station or other disposal point. The densifier receives comminuted waste material which has been separated into burnable material thereby providing cubes 14 which are of dense compacted construction that are burnable in the same manner as other combustible material thereby enabling the cubes to be used as a fuel wherever desired such as in firing a boiler, providing a heat source and the like.

Figure 2:
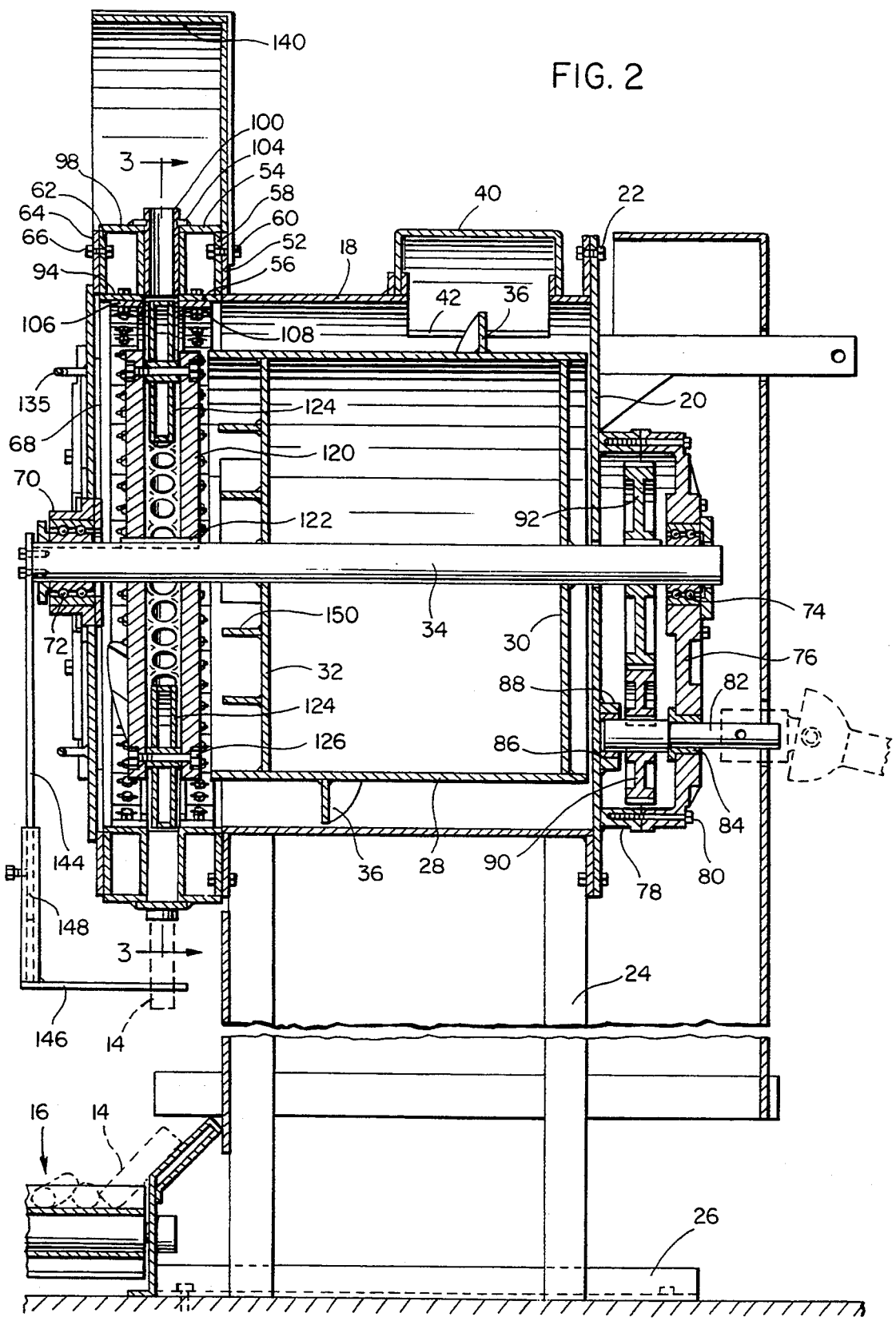
FIG. 2 is a vertical sectional view, on an enlarged scale, taken substantially upon a plane passing along section line 2—2 on FIG. 1 illustrating specific structural details of the densifier.

The densifier 10 includes a generally cylindrical housing 18 having a removable end wall 20 secured thereto by fastening bolts 22 and the like. The housing 18 is stationarily supported by support members 24 connected to a supporting base and supporting surface as at 26. The cylindrical housing 18 is provided with a concentrically disposed rotatable drum 28 therein with the drum also being cylindrical and provided with end plates 30 and 32 which are spaced inwardly from the end edges of the drum 28 as illustrated in FIG. 2. Centrally mounted in the drum 28 is a shaft 34 that extends through the end plates 30 and 32 and are rigid therewith and rotate therewith with the shaft 34 being driven in a manner described hereinafter in order to rotate the drum 28. Positioned on the exterior of the drum 28 is a pair of spiral flights 36 which generally extend radially a distance substantially equal to the concentric spaced relation between the housing 18 and the drum 28 so that any material deposited onto the exterior surface of the drum 28 will be moved axially between the drum 28 and the housing 18.

The cooling elevator 12 may be a belt-type conveyor, auger-type conveyor or the like and includes an elongated inclined housing 38 having a discharge upper end 40 including a chute 42 that discharges material into the interior of the housing 18 and onto the outer surface of the drum 28 adjacent the end thereof that is closest to the end wall 20 of the housing 18 as illustrated in FIG. 2. The waste material discharged from the conveyor 38 will be cooled by and provided with moisture by a plurality of spray nozzles 44 connected to a pipe 46 extending longitudinally of the conveyor and supported by a bracket structure 48 in overlying relation to the open top 50 of the conveyor 38. The conveyor 38 receives comminuted and separated waste material which includes paper and other cellulosic products that are readily burnable with the waste material being supplied by a previous station in a waste recycling facility.

Figure 4:
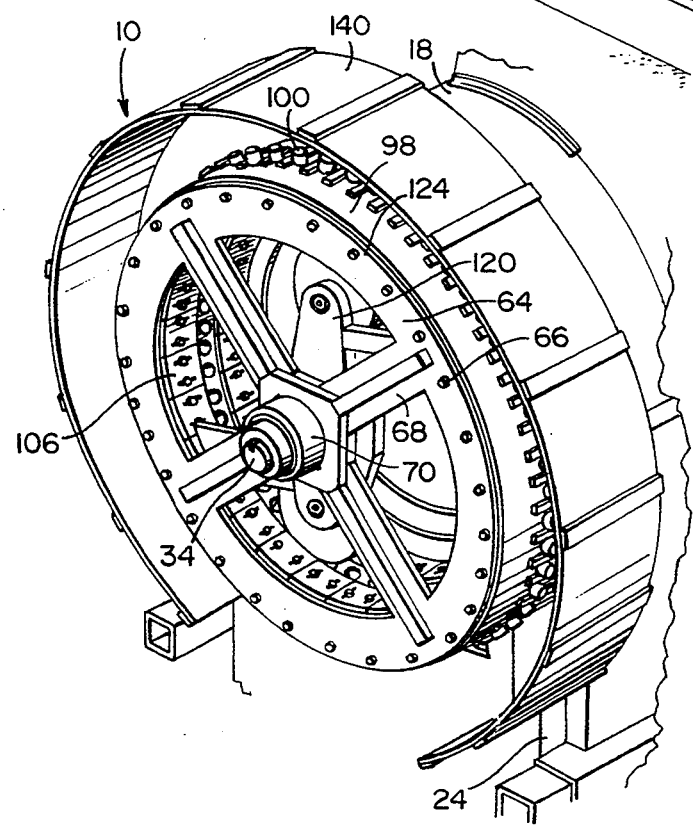
FIG. 4 is a perspective view of a portion of the densifier with the inspection plates removed.

The end of the housing remote from the end wall 20 is provided with an outwardly projecting peripheral flange 52 which is connected to a pair of plates 54 and 56 which are radially and concentrically spaced and extend in a circular manner around the housing 18. A second plate 58 is mounted interiorly of the plate 52 and is secured thereto by bolts 60. The outer edge of the plate 54 is secured to a flange or plate 62 and it is secured to a peripheral plate 64 by fastening bolts 66 similar to the fastening bolts 60. This structure forms the periphery of a wheel that includes radial spokes 68 which extend inwardly from the peripheral plate 64 as illustrated in FIGS. 1 and 4 and the spokes terminate in a hub 70 that is journalled on shaft 34 by a bearing assembly 72. The other end of the shaft 34 is journalled in a bearing assembly 74 supported by a support plate 76 secured to a peripheral boss 78 on the end wall 20 by fastening bolts 80 thereby rotatably supporting the shaft 34 in relation to the stationary housing 18 and hub 70.

The shaft 34 is driven by a power takeoff or power shaft 82 extending through a bearing 84 in the support 76 and also supported by a bearing 86 that is supported by a boss 88 on the end all 20 as illustrated in FIG. 2. A drive gear 90 is secured to the shaft 82 and is in meshing engagement with a gear 92 fixedly and drivingly connected to the shaft 34 thereby rotating the shaft from the power input 82 which may be any of several sources of power including a power takeoff, electric motor, internal combustion engine or the like.

Figure 5:
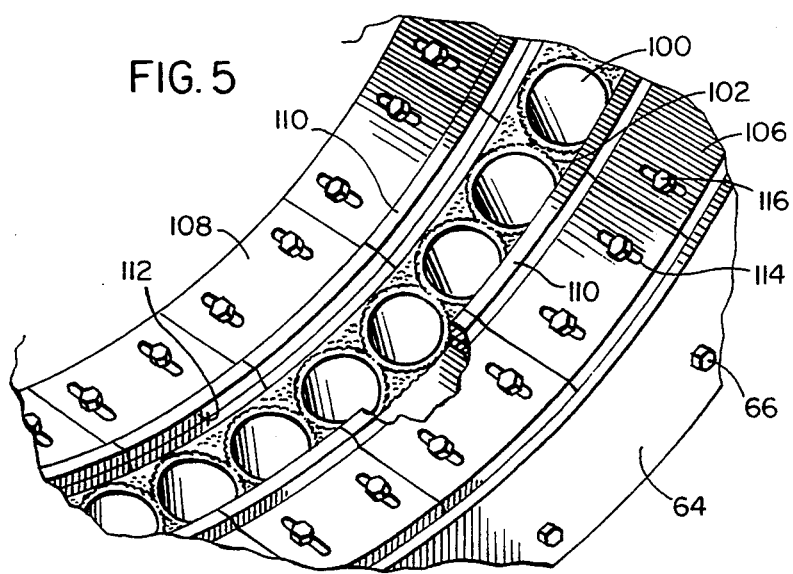
FIG. 5 is a fragmental perspective view of the die tubes and adjustable wear rails.

The plate 64 forming the wheel and the plate 62 include a plate 94 similar to the plate 56 and an outer plate 98 similar to the plate 54 as illustrated in FIG. 2 thus defining a support area for a plurality of cylindrical die tubes 100 each of which has an inner end welded to a peripheral plate structure defined by the inner edges of the plates 56 and 94 as indicated by reference numeral 102 in FIG. 5 with the outer ends of the die tubes 100 being fixedly attached to the plates 54 and 98 at 104. Mounted on the inner surface of the plates 94 are a plurality of segmental wear rails 106 and wear rails 108 are mounted on the plates 56 with the inner edges of each of the wear rails 106 and 108 including a flange 110 extending radially inwardly to define a trough-like structure 112 along the inner ends 102 of the die tubes 100. As illustrated, each of the wear rails 106 and 108 include slots 114 receiving mounting bolts 116 to enable the wear rails to be moved inwardly and outwardly in an adjustable manner to vary the width of the compression trough structure 112 into which waste material is discharged and compacted by a roller assembly generally designated by reference numeral 118.

Figure 3:
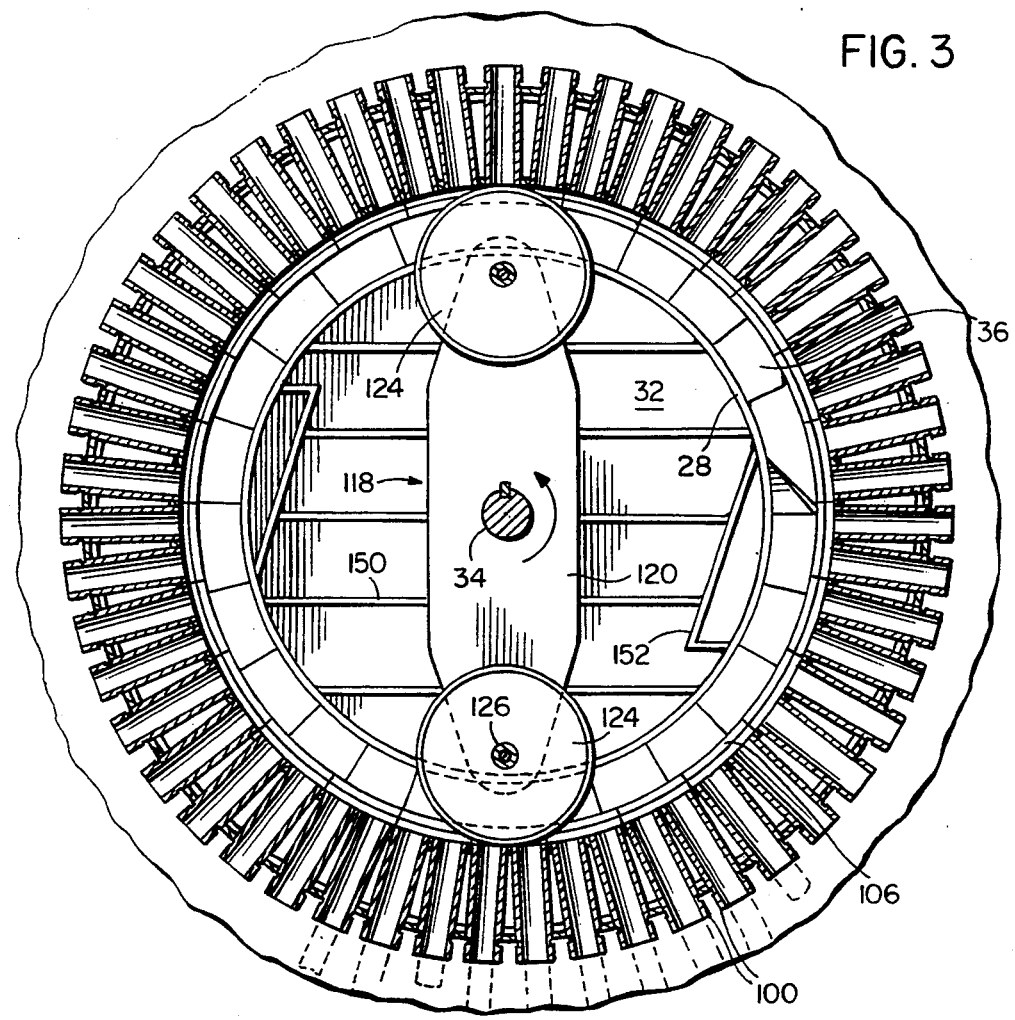
FIG. 3 is a vertical sectional view taken substantially upon a plane passing along section 3—3 on FIG. 2 illustrating further structural details of the densifier.

The roller assembly 118 includes a diametrically extending arm 120 keyed to the shaft 34 by a key member 122 for rotation with the shaft 34 and drum 28. Each end of the diametric arm 120 is provided with a cylindrical roller 124 oriented for rolling engagement with the inner ends of the die tubes 100 as illustrated in FIG. 3. Any material positioned on the inner ends of the die tubes between the flanges 110 forming the trough 112 will be compacted and compressed as the rollers 124 roll around the interior of the die tubes between the flanges 110 on the wear rails 106 and 108.

Figure 6:
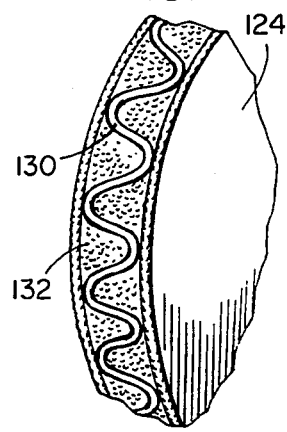
FIG. 6 is a fragmental perspective view of the periphery of one of the compacting rollers.

The diametric arm 120 is in the form of a pair of spaced plates rigidly affixed together and journalling the rollers 124 between the ends thereof on fastening bolts 126 to enable assembly and replacement of the rollers when desired. FIG. 6 illustrates the periphery of one of the rollers 124 which includes a zig zag or serpentine rib 130 that is welded to the exterior surface of the roller which maintains compacted waste material 132 on the external surface of the roller 124 thereby assuring that a substantial portion of the wear caused by compaction and compression of the waste material 132 will occur on the waste material itself since the waste material will continuously be positioned on the roller 124 and effectively compress and compact waste material that is discharged into the trough area 112 by the spiral flights 36 on the drum 28 which rotates at the same speed as the roller supporting arm 120.

A closure plate or plates 134 are provided on the exterior of the stationary wheel formed by the peripheral plate 64 as illustrated in FIG. 1 with the plate 134 including handles 135 and offset sleeve structures 136 which are laterally positioned over the hub and arms or spokes 68 and secured to the spokes by fastening bolts 138 thus securing the plate 134 in closed relation to the open side of the wheel as illustrated in FIG. 1 with the plate being removed in FIG. 4 to illustrate the manner in which access is obtained to the interior of the densifier for replacement and repair of components as may become necessary during normal use. A shroud or shield 140 is positioned around the densifier in partially enclosing relation to the periphery of the densifier so that any cubes 14 extruded from the die tubes 100 will be discharged from an open bottom 142 of the shield. Also, a breakoff device is attached to the end of the shaft with the breakoff device including a radial support arm 144 secured to the shaft 34 with the breakoff arm including a lateral extension 146 which extends into a position to engage the cubes as they are extruded from the die tubes as illustrated in FIG. 2 thus breaking off the cubes at any desired length inasmuch as the radial arm 144 may be telescopically or longitudinally adjustable as at 148.

While a single row of die tubes has been illustrated, it is pointed out that multiple rows of die tubes may be utilized to increase the capacity of the machine. For example, two or three rows of die tubes may be utilized with individual rollers engaging each row of die tubes or, in some instances, a larger diameter or wider roller at each end of the support arm may be utilized. The die tubes are rigidly affixed to a peripheral support plate by hard rod welding around the opening of the die tube or die cell which enables this area to be built up a number of times thereby increasing the life expectancy of the die tubes especially when considering that the waste material mounted on the outer periphery of the roller within the areas defined by the zig zag rib 130 reduces the potential for wear of the die tubes. Also, while the die tubes have been illustrated as of cylindrical configuration, the cross-sectional configuration can be other shapes including square, polygonal, oval and the like depending upon the cross-sectional configuration of the cubes desired to be formed.

The flow path of the material is along the periphery of the drum 28 for discharge directly onto the inner ends of the die tubes 100 within the trough area 112. The end plate 32 is provided with transverse plates 150 for rigidity and deflectors 152 are provided at each side of the drum 28 to deflect all material into the area formed by the trough-like structure 112. The waste material cannot exit from the densifier because of the closure door 134 thereby assuring that all the material will be compressed and compacted in the die tubes 100.

Figure 7:
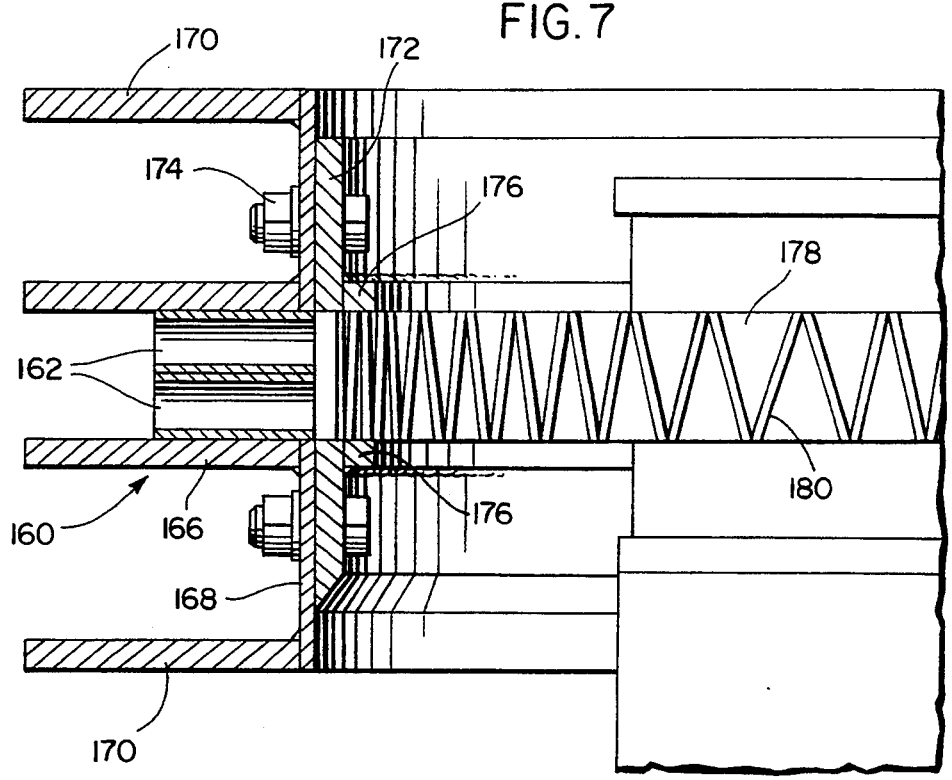
FIG. 7 is sectional view of the die tube assembly that is slightly modified as compared to FIG. 2 illustrating the relation of the die tubes, rollers, side plates and adjustable wear rails.
Figure 8:
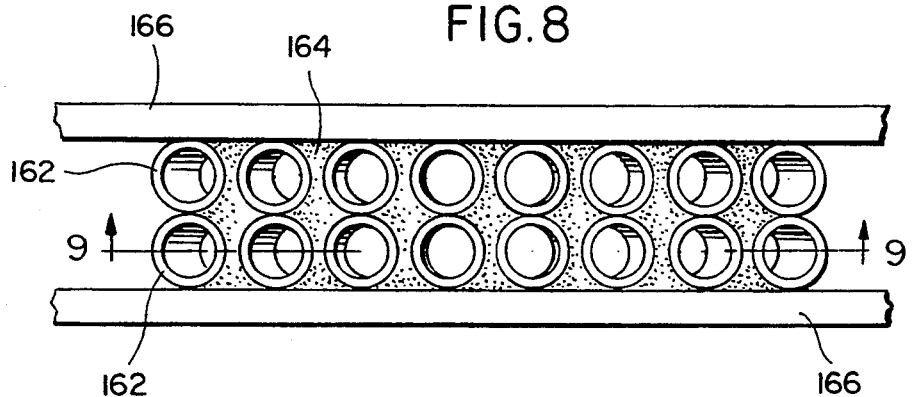
FIG. 8 is a detailed view of a die tube segment.
Figure 9:
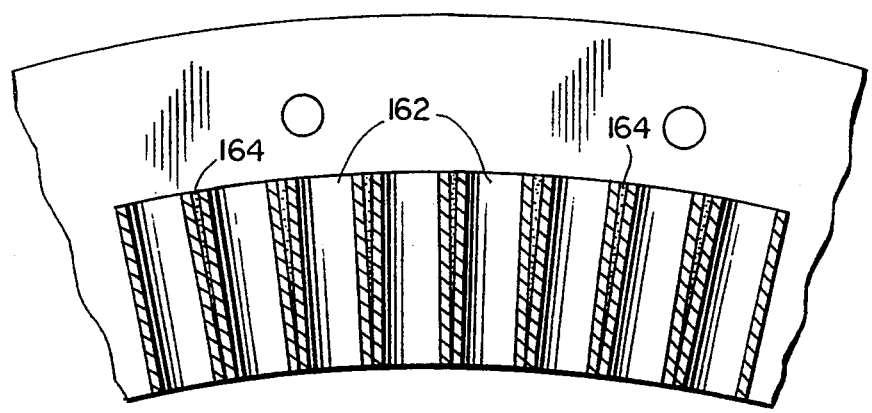
FIG. 9 is a sectional view of the structure shown in FIG. 8.

FIGS. 7–9 illustrate, in more detail, the specific preferred construction of the die tubes and related structure forming the wheel with the die tube assembly generally being designated by reference numeral 160 and including a plurality of tubes 162 which may be cylindrical, square, hexagonal or any other desired shape which are radially disposed and oriented in contacting, welded relation with the welding material being designated by reference numeral 164 with it being noted that the welding material will increase in thickness and volume between the inner ends of the tubes 162 and the outer ends thereof. The tubes 162 may be welded together in a complete circle or in segments or sections to facilitate assembly and removal of sections or segments for replacement or repair. Thus, the die tubes or cells are placed in a fixture and welded to form a solid block die with circular side plates 166 welded to the outer surfaces of the die tubes. While two rows of die cell tubes are illustrated, this number of cells or rows of cells may vary as may the size and shape. As illustrated in FIG. 9, the side plates 166 extend radially outwardly from the tubes 162 and are rigidly affixed thereto. The inner ends of the plates 166 have lateral plates 168 rigid therewith which, in turn have outer side plates 170 fixed thereto. Adjustably mounted on the plates 168 are rail plates 172 secured by bolts 174 through slots in a manner similar to that illustrated in FIG. 5 with wear rails 176 being provided on the inner edges of the rail plates 172 to form a trough for the material and a channel for the rollers 178 in the same manner as illustrated in FIGS. 3–6. The rollers 178 are the same as the rollers 124 with a serpentine or zig zag rib 180 welded thereto so that material will cling to the rollers to keep wear off of the rollers and on the material clinging to the rollers with the wear rails 176 being adjustable inwardly to take up wear.

This structure functions in a manner similar to that illustrated in FIG. 1–6 and more specifically illustrates a preferred assembly of the die cell tubes 162 and side plates 166 all of which are welded into a rigid unit either as a complete circle or as segments of a circle which can be rigidly connected by welding or the like when assembled.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A densifier for compacting and compressing comminuted waste material comprising a stationary housing, a rotatable drum mounted in concentrically spaced relation within the housing, means on the drum for conveying waste material axially along the external surface of the drum, a plurality of die tubes rigidly mounted on the housing in a stationary manner in a circular pattern circumferentially at one end of the drum, said die tubes having inner ends positioned to receive waste material from the drum, said die tubes having outer ends spaced radially outwardly from the inner ends, roller means mounted on the drum engaging waste material on the inner ends of the die tubes and compressing and compacting said waste material into the die tubes to form dense cubes that are extruded from the outer ends of the die tubes, means forming a closure for the housing axially outwardly of the die tubes to prevent material from being discharged past the die tubes by the drum and means varying the entry dimensions of the die tubes and forming a peripheral trough receiving waste material from the drum.

2. The structure as defined in claim 1 wherein said roller means includes a diametric arm rigid with the drum and a roller mounted on each end of the arm, each roller including an angulated rib on the peripheral surface thereof for compressing waste material and causing the waste material to build up on the surface of the roller thereby wearing the waste material rather than the roller.

3. The structure as defined in claim 1 wherein said drum and housing are concentrically cylindrical with the drum being spaced from the housing, said means on the drum for moving the material axially including at least one spiral flange on the exterior of the drum and terminating in closely spaced relation to the housing to move material axially between the drum and housing.

4. The structure as defined in claim 3 together with conveyor means supplying comminuted waste material to the space between the housing and drum.

5. The structure as defined in claim 4 wherein said conveyor means is an inclined elevator structure having an open top and provided with a plurality of liquid discharge nozzles associated therewith by which moisture can be discharged into the material being conveyed for cooling the material and increasing the moisture content thereof.

6. The structure as defined in claim 3 wherein said die tubes are rigidly welded to each other and between side plates defining a wheel of stationary construction secured to the housing, said die tubes being supported between the plates and welded thereto by renewable welding material to enable the inner ends of the die tubes to be built up in the event of wear.

7. The structure as defined in claim 6 wherein said wheel includes support spokes, said means forming a closure including a circular closure plate mounted on said spokes and forming a closure for the wheel.

8. The structure as defined in claim 7 wherein said peripheral trough includes adjustable wear rails, said wear rails including an inwardly extending flange whereby the inwardly extending flanges are movable towards each other or away from each other in opposed relation to define the side walls of said peripheral trough along edges of the inner ends of the die tubes.

9. The structure as defined in claim 8 wherein said roller means includes a diametric arm rigid with the drum and a roller mounted on each end of the arm, each roller including an angulated rib on the peripheral surface thereof for compressing waste material and causing the waste material to build up on the surface of the roller thereby wearing the waste material rather than the roller.

10. The structure as defined in claim 9 together with conveyor means supplying comminuted waste material to the space between the housing and drum.

11. The structure as defined in claim 10 wherein said conveyor means is an inclined elevator structure having an open top and provided with a plurality of liquid discharge nozzles associated therewith by which moisture can be discharged into the material being conveyed for cooling the material and increasing the moisture content thereof.

12. The structure as defined in claim 1 wherein said housing includes a shield enclosing the outer ends of the die tubes, said shield having a bottom opening to enable discharge of the cubes to conveying means.

13. The structure as defined in claim 1 wherein said die tubes are supported by annular plates defining an open wheel, said means forming a closure including a circular plate, and means removably securing the circular plate in position on the wheel to close the interior thereof and enable access to the inner ends of the die tubes when removed.

14. The structure as defined in claim 1 together with means to break off the cubes from the die tubes when extruded to an adjustable predetermined length.

15. A densifier for compacting and compressing waste material into a solid block form comprising a generally circular stationary wheel having a plurality of radially disposed tubes oriented in circumferential aligned relation, said tubes having rigidly mounted inner ends and outer ends to form a rigid circular wheel with the inner ends of the tubes receiving waste material to be compacted and compressed, a circular roller oriented within said wheel and including a periphery oriented adjacent the inner ends of said tubes, means rotatably supporting and driving said roller for movement in a circular path to compress and compact waste material into the inner ends of said tubes for discharging a compacted block from the outer end of each tube, means supplying waste material onto the inner ends of the tubes in advance of said roller whereby the roller will compress and compact the material into the tubes during its movement in a circular path, said wheel including laterally adjustable wear rails extending radially inwardly from the inner ends of the tubes to form a trough for the waste material and form a channel for receiving the periphery of the roller.

16. The densifier as defined in claim 15 wherein said roller periphery includes a continuous projection to hold waste material thereon whereby wear between the roller and tubes Will be reduced by the waste material being positioned between the roller and tubes.

17. The densifier as defined in claim 15 together with a pair of circular side plates rigidly welded to the die tubes with the side plates being in spaced parallel relation to rigidify the die tubes, said side plates including an outer peripheral edge positioned outwardly beyond the outer ends of the die tubes to stabilize and rigidify the die tubes.

18. A densifier for compacting and compressing waste material into solid pellets comprising a generally circular stationary wheel having a plurality of radially disposed tubes oriented in circumferential aligned relation, said tubes having rigidly mounted inner ends and outer ends to form a rigid circular wheel with the inner ends of the tubes receiving waste material to be compacted and compressed, a circular roller oriented within said wheel and including a periphery oriented adjacent the inner ends of said tubes, means rotatably supporting and driving said roller for movement in a circular path to compress and compact waste material into the inner ends of said tubes for discharging compacted pellets from the outer ends of said tubes, rotatable means supplying waste material peripherally of the wheel onto the inner ends of the tubes in advance of said roller whereby the roller will compress and compact the material into the tubes during its movement in a circular path, said wheel including axially spaced, peripheral rails extending radially inwardly from opposite sides of the inner ends of the tubes to form a trough for the waste material and form a channel for receiving the periphery of the roller.

* * * * *